United States Patent
Nors

(10) Patent No.: US 9,497,019 B2
(45) Date of Patent: Nov. 15, 2016

(54) TIME DOMAINS IN A PON

(75) Inventor: Niclas Nors, Mjölby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 8 days.

(21) Appl. No.: 14/409,168

(22) PCT Filed: Jul. 20, 2012

(86) PCT No.: PCT/SE2012/050844
§ 371 (c)(1),
(2), (4) Date: Dec. 18, 2014

(87) PCT Pub. No.: WO2013/191608
PCT Pub. Date: Dec. 27, 2013

(65) Prior Publication Data
US 2015/0163049 A1    Jun. 11, 2015

Related U.S. Application Data

(60) Provisional application No. 61/661,077, filed on Jun. 18, 2012.

(51) Int. Cl.
*H04L 7/00* (2006.01)
*H04J 3/06* (2006.01)
*H04Q 11/00* (2006.01)

(52) U.S. Cl.
CPC ........... *H04L 7/0075* (2013.01); *H04J 3/0664* (2013.01); *H04Q 11/0067* (2013.01); *H04J 3/0641* (2013.01); *H04Q 2011/0088* (2013.01)

(58) Field of Classification Search
CPC .............. H04L 7/0075; H04J 3/0635–3/0697
See application file for complete search history.

(56) References Cited

U.S. PATENT DOCUMENTS

| | | | |
|---|---|---|---|
| 6,643,683 B1* | 11/2003 | Drumm | G06F 17/5031 703/19 |
| 2007/0003282 A1 | 1/2007 | Boyd | |
| 2008/0037986 A1* | 2/2008 | Effenberger | H04J 14/0227 398/58 |
| 2008/0044183 A1* | 2/2008 | Perkins | H04J 3/07 398/58 |
| 2010/0303100 A1* | 12/2010 | Niamut | H04L 65/80 370/503 |

(Continued)

FOREIGN PATENT DOCUMENTS

WO    2011088727 A1    7/2011

OTHER PUBLICATIONS

ITU-T G.984.3, Telecommunication Standardization Sector of ITU, Amendment 2 (Nov. 2009); Series G: Transmission Systems and Media, Digital Systems and Networks, Digital sections and digital line system—Optical line systems for local and access networks; Gigabit-capable Passive Optical Networks (G-PON): Transmission convergence layer specification; Amendment 2: Time-of-day distribution and maintenance updates and clarifications.

(Continued)

*Primary Examiner* — David Payne
*Assistant Examiner* — Casey Kretzer

(57) ABSTRACT

An Optical Line Termination (OLT) is connected to an Optical Network Unit (ONU) over an Optical Distribution Network (ODN), wherein the OLT transmits multiple time domains to the ONU over the ODN for synchronizing client equipment connected to the ONU with different time domains. The multiple time domains are transported in one or more OMCI messages, and each OMCI message comprises a single Managed Entity.

27 Claims, 9 Drawing Sheets

(56) References Cited

U.S. PATENT DOCUMENTS

| | | | |
|---|---|---|---|
| 2011/0142111 A1* | 6/2011 | Sands | H04M 11/062 375/222 |
| 2011/0262133 A1* | 10/2011 | Yuan | H04J 3/0667 398/43 |
| 2012/0008953 A1 | 1/2012 | Lu | |
| 2012/0027405 A1 | 2/2012 | Zheng | |
| 2012/0027414 A1 | 2/2012 | Wei | |
| 2012/0106976 A1 | 5/2012 | Bernard et al. | |
| 2013/0089170 A1* | 4/2013 | Chiesa | H04J 3/0685 375/356 |
| 2014/0348505 A1* | 11/2014 | Bernstein | H04B 10/2575 398/58 |

OTHER PUBLICATIONS

ITU-T G.988, Telecommunication Standardization Sector of ITU, (Oct. 2010); Series G: Transmission Systems and Media, Digital Systems and Networks, Digital sections and digital line system—Optical line systems for local and access networks; ONU management and control interface (OMCI) specification; pp. 315-331.

* cited by examiner

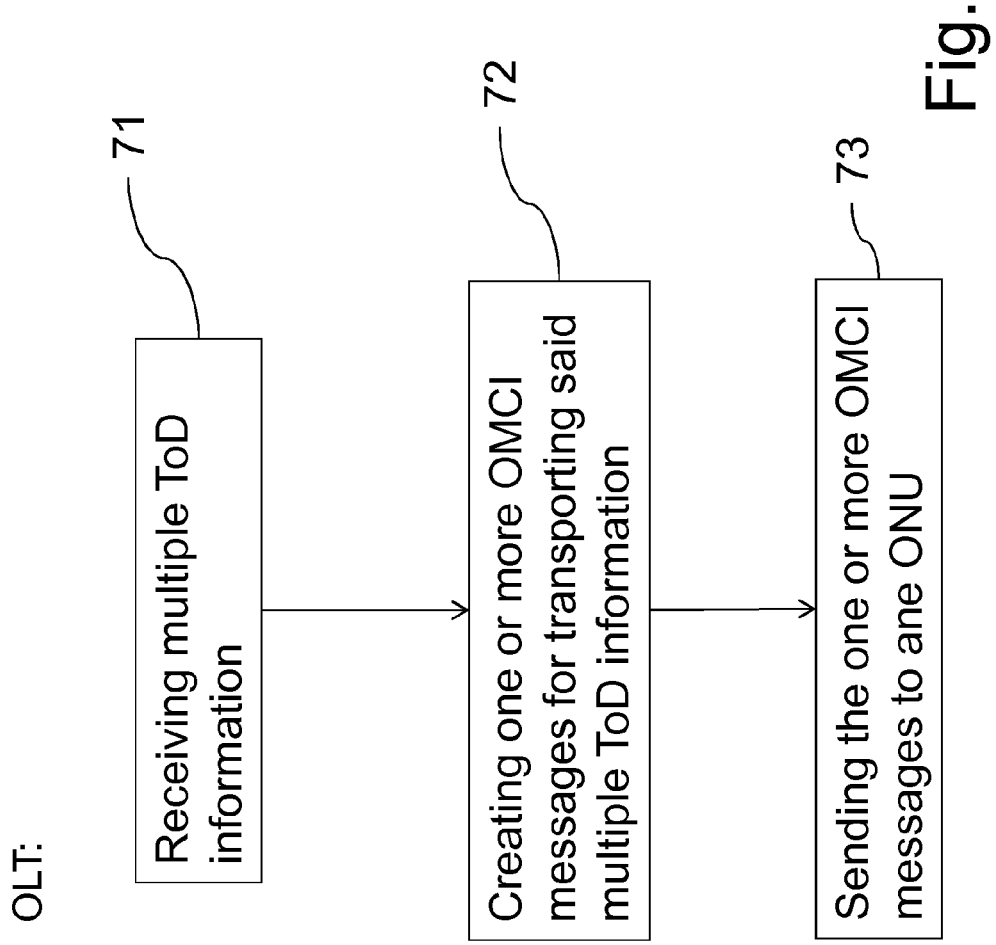

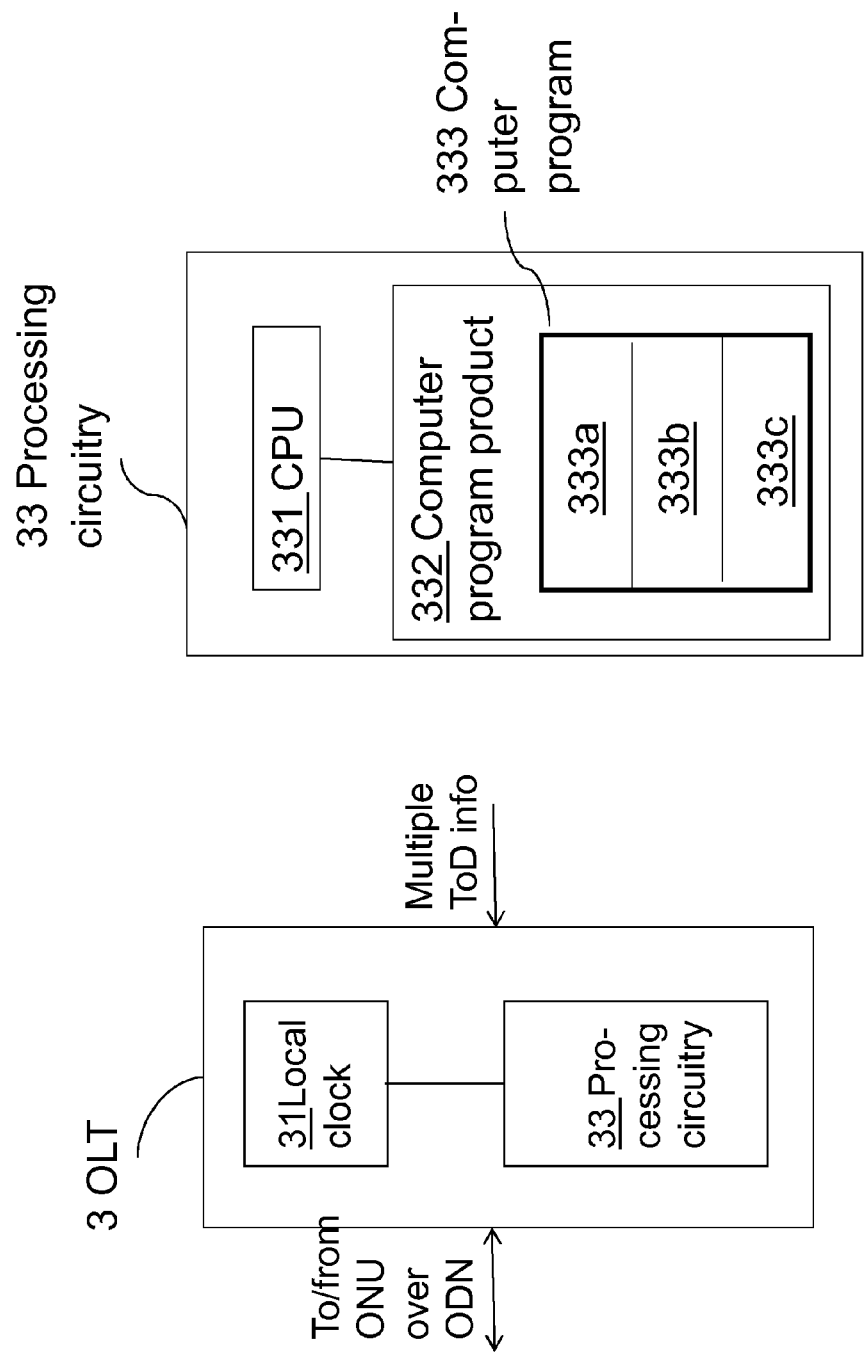

TIME DOMAINS IN A PON

This application is a 371 of International Application PCT/SE2012/050844, filed Jul. 20, 2012, which claims the benefit of U.S. Provisional Application No. 61/661,077, filed Jun. 18, 2012, the disclosures of which are fully incorporated herein by reference.

TECHNICAL FIELD

The invention relates to methods for an Optical Network Unit, ONU, and for an Optical Line Termination, OLT, in a Passive Optical Network, PON, of managing a time-of-day synchronization with two or more reference clocks. The invention also relates to an ONU and an OLT for a PON, wherein the ONU and the OLT are arranged to manage a time-of-day synchronization with at least two reference clocks.

BACKGROUND

A broadband access may be implemented by a passive fiber optical access network, such as e.g. by a G-PON (Gigabit-capable Passive Optical Network), or an EPON (Ethernet Passive Optical Network), wherein a PON (Passive Optical Network) does not require any active electrical components for splitting the optical signals. A passive optical network typically comprises an OLT (Optical Line Termination) and one or more ONTs (Optical Network Terminals) and/or ONUs (Optical Network Units) connected by an ODN (Optical Distribution Network), which comprises optical fibers and passive optical power splitters.

The OLT is typically located at a Central Office, CO, associated with a service provider, e.g. an operator, and the CO provides an interface for delivery of services to subscribers/end-users over the PON. Each ONT/ONU terminates the PON and converts the optical signals into electrical signals for delivery of the services to terminals of the subscribers/end-users, via a suitable user interface.

The above-mentioned terms ONU and ONT both indicate a device that terminates any one of the distributed (leaf) endpoints of an ODN, implements a PON protocol, and adapts PON PDU (Protocol Data Units) to a subscriber-service interface. Further, the term CPE (Customer-Premises Equipment) may also be used for indicating an ONU or an ONT.

However, the term ONU will hereinafter be used as a generic term in this disclosure and in the appended claims, and will refer to any of an ONU, an ONT or a CPE.

An ONU of a PON is managed by the ONT Management and Control Interface (OMCI) protocol, which is a standardized PON-management protocol. The OMCI-specification ITU-T G.988 (October 2010) defines e.g. different Managed Entities, MEs, which are abstract representations of resources and services in an ONU, wherein a Managed Entity comprises a number of attributes. An OMCI message is a data packet transmitted over the ODN, wherein the data packet typically comprises one Managed Entity and control information.

The use of asynchronous packet-switched techniques has enabled an explosive growth of various telecom and datacom-services, but it has also made timing recovery more complicated. Many of the services that are available today require frequency-, phase- or time-of-day (ToD) synchronization, and the switching and multiplexing of data in packet sized quantums will result in a packet delay variation (PDV), which complicates the frequency synchronization. Further, the phase- and ToD-synchronization require a determination of the transmission delay between two nodes. However, some access technologies, e.g. G-PON, EPON and xDSL (Digital Subscriber Line), have asymmetric transmission delays, i.e. the uplink delay and the downlink delay are different, wherein a determination of the transmission delay is more complicated.

The commonly used timing protocols for packet-switched network, e.g. the IEEE 1588-2008 or the NTP (Network Time Protocol), are able to compensate for Packet Delay Variation (PDV) for frequency synchronization recovery. They may also be capable to compensate for symmetric transmission delays, i.e. a transmission delay that is essentially equal in both directions, in order to provide a phase and time-of-day synchronization. However, none of the above-mentioned timing protocols are able to compensate for asymmetric transmission delays.

Instead, access-specific methods have been introduced and standardized for overcoming the problem with the asymmetric transmission delay, e.g. in a passive optical network, when using conventional timing protocol for time-of-day synchronization. However, these methods are only capable of providing time-of-day information based on one reference clock to a remote node, such as the ONU or the CPE, i.e. in only one so-called time domain.

Hereinafter, the term time domain refers to time information based on one timing source or reference clock, and multiple time domains indicate time information based on two or more (different) timing sources or reference clocks.

In a multi-operator environment, in which one fixed network is providing Mobile Backhaul (MBH) services to client equipment served by different mobile operators, each operator may have its own timing source or reference clock. Thus, it is desirable that a passive optical network is able to transport multiple time domains, i.e. individual time-of-day information for each operator, in order to perform a time-of-day synchronization of multiple client equipment that are connected to the same remote node, but are served by different operators that may have different reference clocks.

SUMMARY

It is an object of exemplary embodiments of the invention to address at least some of the issues outlined above, and this object and others are achieved by the methods and the devices according to the appended independent claims, and by the embodiments according to the dependent claims.

A first aspect of exemplary embodiments provides a method for an Optical Network Unit, ONU, in a Passive Optical Network, PON, of managing a time-of-day synchronization with at least two reference clocks. The ONU is connected to an Optical Line Termination, OLT, over an Optical Distribution Network, ODN, and to at least two client equipment. The method comprises the ONU performing the following steps:

Receiving one or more OMCI messages from the OLT, said one or more OMCI messages transporting time-of-day information from at least two reference clocks over the ODN, wherein each reference clock is associated with at least one of said client equipment;

Creating at least two individual time-of-day messages, each message being based on time-of-day information from one of said reference clocks;

Sending each of the at least two individual time-of-day messages to the at least one client equipment associated with the corresponding reference clock, for synchronizing the client equipment with the reference clock.

The ONU may further synchronize a local clock in the ONU with one of said at least two reference clocks.

A second aspect of exemplary embodiments provides a method for an Optical Line Termination, OLT, in a Passive Optical Network, PON, of managing a time-of-day synchronization with at least two reference clocks. The OLT is connected to an Optical Network Unit, ONU, over an Optical Distribution Network, ODN, and the ONU is connected to at least two client equipment. The method comprises the OLT performing the following steps:

Receiving time-of-day information from at least two reference clocks, wherein each reference clock is associated with at least one of said client equipment;

Creating one or more OMCI messages for transporting the time-of-day information from said at least two reference clocks over the ODN;

Sending the one or more OMCI messages to the ONU over the ODN, for synchronizing each of said at least two client equipment with an associated reference clock.

The OLT may further synchronize a local clock in the OLT with one of said at least two reference clocks.

A third aspect of exemplary embodiments provides an Optical Network Unit, ONU, for a Passive Optical Network, PON, wherein the ONU is connectable to an Optical Line Termination, OLT, over an Optical Distribution Network, ODN, and to at least two client equipment. The ONU is arranged to manage a time-of-day synchronization with at least two reference clock, and comprises processing circuitry configured to:

Receive one or more OMCI messages from a connected OLT, said one or more OMCI messages transporting time-of-day information from at least two reference clocks over the ODN, wherein each reference clock is associated with at least one connected client equipment;

Create at least two individual time-of-day messages, each message being based on the time-of-day information from one of the reference clocks;

Send each individual time-of-day message to the at least one connected client equipment associated with the corresponding reference clock, for synchronizing the client equipment with the reference clock.

The ONU may comprise at least two transceivers for communicating with the at least two client equipment, wherein each transceiver is arranged to communicate with one client equipment over a User Network Interface, UNI.

The ONU may further comprise a local clock, wherein the ONU is arranged to synchronize the local clock with one of said reference clocks.

A fourth aspect of exemplary embodiments provides an Optical Line Termination, OLT, for a Passive Optical Network, PON, wherein the OLT is connectable to an Optical Network Unit, ONU, over an Optical Distribution Network, ODN. The OLT is arranged to manage a time-of-day synchronization with at least two reference clocks, and comprises processing circuitry configured to:

Receive time-of-day information from at least two reference clocks;

Create one or more OMCI messages for transporting the time-of-day information from said at least two reference clocks over the ODN;

Send the one or more OMCI messages to the ONU over the ODN, for synchronizing at least two client equipment connected to the ONU with an associated reference clock.

The OLT may be connectable to one or more timing servers for receiving the time-of-day information.

The OLT may further comprise a local clock, wherein the OLT is arranged to synchronize the local clock with at least one of the reference clocks.

According to the above-mentioned aspects of exemplary embodiments, each of said one or more OMCI messages may comprise a single Managed Entity, ME, which contains time-of-day information from one or more of said at least two reference clocks.

The time-of-day information from said at least two reference clocks may be transported over the ODN in a single OMCI message, which comprises as single Managed Entity. Alternatively, the time-of-day information from said at least two reference clocks may be transported over the ODN in at least two OMCI messages, wherein each of said at least two OMCI messages contains time-of-day information from only one reference clock, and each of said at least two OMCI messages comprises a single Managed Entity.

It is an advantage with exemplary embodiments that they allow multiple operators to share the same infrastructure, and still use different time domains. Further, a single ONU in a passive optical network is able to serve client equipment from multiple operators with network timing in different time domains.

BRIEF DESCRIPTION OF THE DRAWINGS

Exemplary embodiments will now be described in more detail, and with reference to the accompanying drawings, in which:

FIG. 7 is an exemplary flow diagram schematically illustrating an OLT performing ToD-synchronisation of two or more client equipment, with different reference clocks;

DETAILED DESCRIPTION

Figure 1:
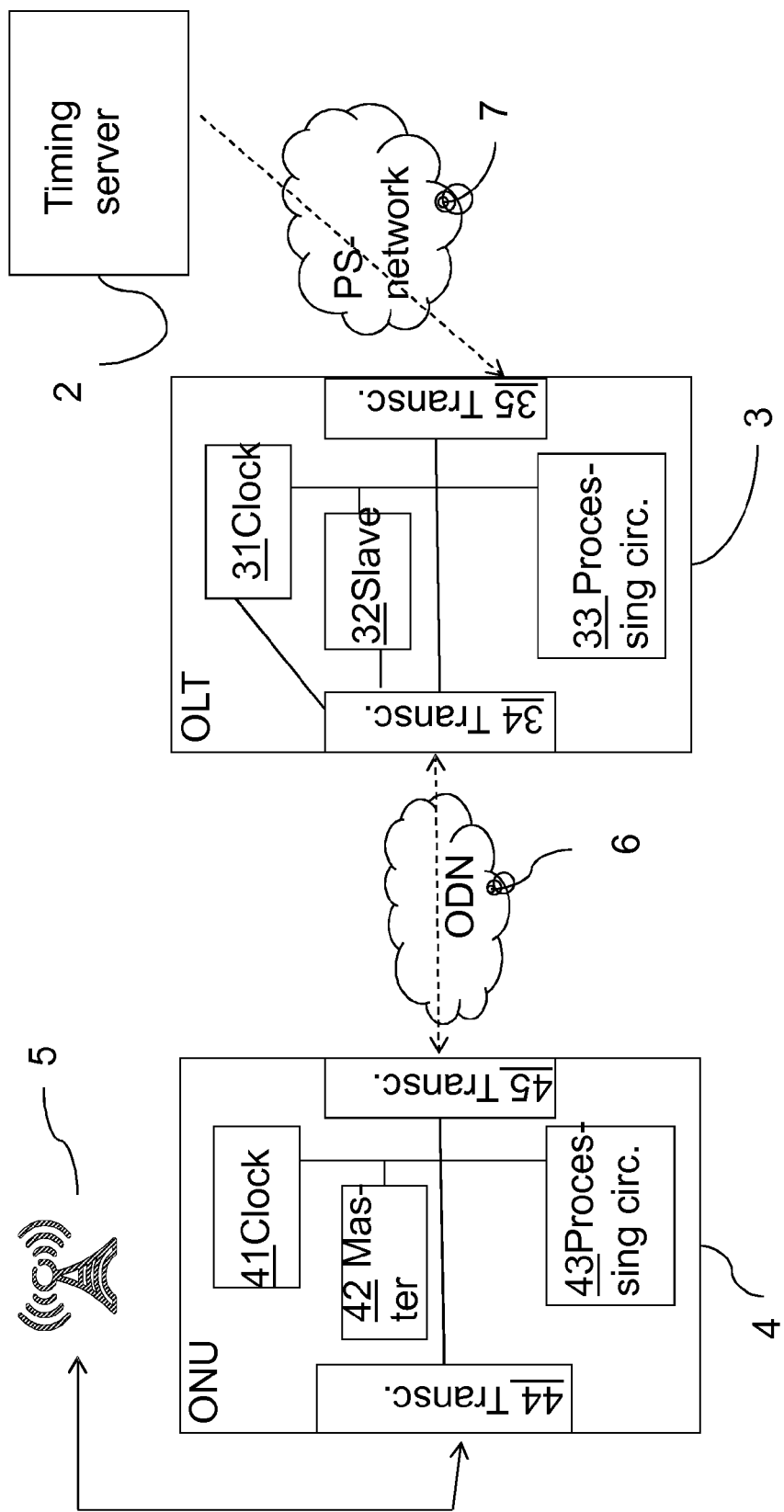
FIG. 1 schematically illustrates an exemplary architecture for a conventional ToD-synchronization of one client equipment over a PON.

In the following description, different exemplary embodiments of the invention will be described in more detail, with reference to accompanying drawings. For the purpose of explanation and not limitation, specific details are disclosed, such as particular scenarios and techniques, in order to provide a thorough understanding.

Moreover, it is apparent that the exemplary methods and devices described below may be implemented, at least partly, by the use of software functioning in conjunction with a programmed microprocessor or general purpose computer, and/or using an application specific integrated circuit (ASIC). Further, while the embodiments of the invention are primarily described in the form of methods and devices, the embodiments may also, at least partly, be implemented as a computer program product or in a system comprising a computer processor and a memory coupled to the processor, wherein the memory is encoded with one or more programs that may perform the functions disclosed herein.

The ITU-T G.984.3, Amd 2, (November 2009) and the above-mentioned ITU-T G.988 (October 2010) define a conventional mechanism for transporting time-of-day information (ToD information) over the ODN, wherein the ToD-information is transported as a part of an OLT-G ME (Managed Entity) in a Time-of-day information-attribute, which is a single attribute. An OMCI message is a data packet transmitted over the ODN, wherein the data packet typically comprises only one Managed Entity, such as e.g. an OLT-G ME comprising a Time-of-day information-attribute. This conventional OLT-G ME comprises the following attributes:

Managed entity ID: This attribute uniquely identifies each instance of the managed entity, and there is only one instance, number 0. The attribute is mandatory, with 2 bytes.

OLT vendor id: This attribute identifies the OLT vendor, and is the same as the four most significant bytes of a specified ONU serial number. The attribute is mandatory, and has 4 bytes.

Equipment ID: This attribute may be used to identify the specific type of OLT. The attribute is mandatory, and has 20 bytes.

Version: This attribute identifies the version of the OLT as defined by the vendor. The attribute is mandatory, and has 14 bytes.

Time of day information: This attribute provides the information required to achieve time-of-day synchronization between a reference clock at the OLT and a local clock at the ONU. This attribute comprises two fields. The first field, with 4 bytes, is the sequence number of the specified GEM superframe, and the second field, with 10 bytes, is a timestamp ($Tstamp_N$). The value 0 in all bytes is reserved as a null value. The attribute is optional, and has 14 bytes.

Thus, the Time of day information-attribute above is a single attribute that only accommodates one timestamp ($Tstamp_N$), i.e. time-of-day information based on only one timing source or reference clock. For this reason, the ToD information transported over the ODN from the OLT for synchronization of an ONU clock, and of client equipment connected to the ONU, may only be based on a single reference clock.

FIG. 1 illustrates schematically an exemplary architecture for the above-described conventional ToD-synchronization of client equipment with an OLT clock, and the figure shows a conventional OLT 3 connected to a conventional ONU 4 over an ODN 6.

However, please note that the illustrated units in the OLT and the ONU in FIG. 1 are only logical units for indicating a specific function of the OLT and the ONU, and the functions may be implemented by any appropriate hardware and/or software.

In FIG. 1, the OLT is connected to a timing server 2, e.g. a conventional IEEE1588-2008 Time server, over a packet-switched network 7. The OLT further comprises a slave function 32 to the timing server, a local clock (oscillator) 31, suitable processing circuitry 33, and a transceiver 34 for communicating with the ONU over the ODN. The OLT receives ToD-information from the timing server via a transceiver 35, and the slave function 32 in the OLT recovers the time from the ToD-information and sets the time of the OLT clock 31. The transceiver 34 is provided with a reference clock signal from the local clock 31, and ToD information from the slave function, and the transceiver typically includes a GPON MAC-functionality.

The ONU 4 comprises a master function 42 to the timing server, a local clock 41, and suitable processing circuitry 43, and is further connected to client equipment 5, e.g. a base station, via the transceiver 44, and with the OLT via the transceiver 45.

In an exemplary conventional G-PON time-of-day synchronization of the local clock 41 in the ONU with the local clock 31 in the OLT, the transceiver 34 in the OLT periodically transmits a value of a GPON frame counter, e.g. a 30-bit value, to the ONU, and the value is incremented by one unit for each transmission. The OLT also once or periodically transports ToD-information in the OLT-G ME of an OMCI message to the ONU over the ODN, wherein the ToD information comprises only one time value, based on one reference clock, such as e.g. an 80-bit timestamp ($Tstamp_N$).

However, this OMCI message is susceptible to PDV, since it is multiplexed into a data stream that includes other packet types, and since it typically is generated and received by software-controlled processors. In order to compensate for the PDV, the OMCI message transporting the ToD information may also include specific information, such as e.g. "the ToD epoch provided in this message (e.g. Jan. 28, 2012, 03:09:00 AM plus 0 ns) will be valid when the GPON Frame Counter=278". Since the OMCI message is sent before the specified value of the GPON Frame Counter, e.g. 1 second in advance, the ONU will have time to receive and process the OMCI message. The OLT must also estimate a one-way transmission delay from the OLT to the ONU, and provide the ONU with the delay, e.g. 25 µs. The synchronization of the local clock 41 in the ONU with the local clock 31 in the OLT is performed by setting the local clock 41 in the ONU according to the specific time value indicated in the timestamp ($Tstamp_N$) of the OMCI message, plus the transmission delay, at the moment when the GPON Frame Counter reaches the specified count. Thus, in the example described above, the local clock 41 in the ONU will be set to Jan. 28, 2012, 03:09:00 AM plus 25000 ns when the GPON Frame Counter=278.

After setting the local clock 41 in the ONU, the master function 42 in the ONU, e.g. an IEEE1588 master function, is able to provide the time-of-day information from the local clock 41 to a client equipment 5 connected to the ONU, such as e.g. a base station, and synchronize the base station with the local clock 41 in the ONU.

Thus, in the above-described exemplary conventional time-of-day synchronization, time-of-day information from only one timing source, i.e. one time domain, is transmitted from the OLT to the ONU over the ODN, since the standardized ToD information-attribute transported from the OLT to the ONU in the OLT-G ME of the OMCI message only accommodates a single ToD information attribute.

However, multiple operators, each having their own reference clock that may not be synchronized with the reference clock of the other operators, will require individual time-of-day information from different reference clocks.

In order to accomplish a synchronization with more than one reference clock, exemplary embodiments of this invention involves a transport of Time-of-Day (ToD) information based on two or more reference clocks, i.e. multiple time domains, from the OLT to the ONU over the ODN in one or more OMCI messages, in order to synchronize two or more client equipment connected to the ONU with different reference clocks.

Figure 2:
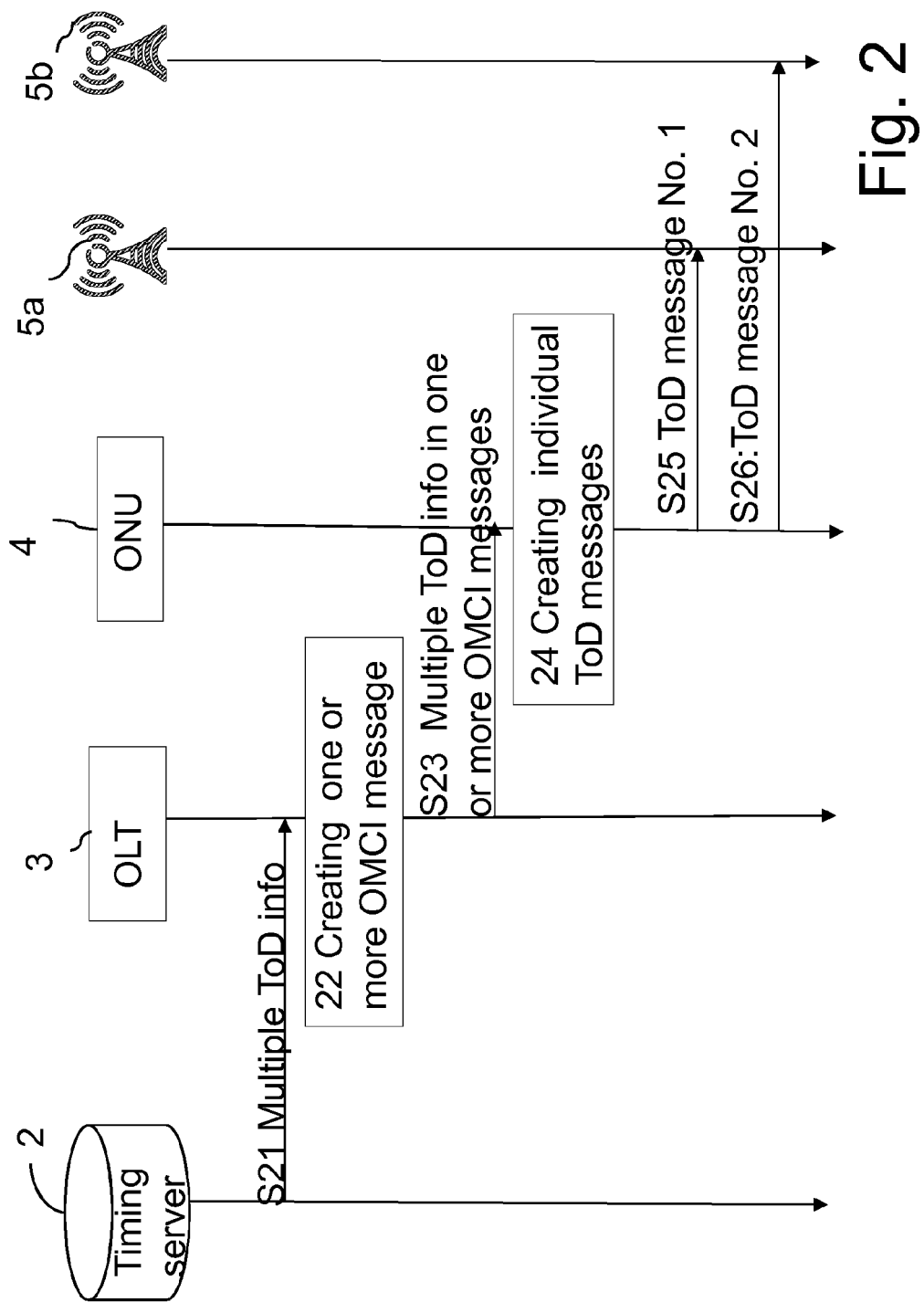
FIG. 2 is a sequence diagram schematically illustrating an exemplary ToD-synchronization of two client equipment, with different reference clocks, according to exemplary embodiments.

FIG. 2 is a sequence diagram schematically illustrating an exemplary ToD-synchronization of two client equipment with two different reference clocks, according to exemplary embodiments. The sequence diagram shows a timing server 2, an OLT 3, and ONU 4, and two client equipment 5a, 5b, e.g. base stations.

In signal S21, the OLT receives time-of-day information in two time domains, i.e. ToD information based on two reference clocks, from a timing server 2. In step 22, the OLT creates one (or two) OMCI messages, wherein the one or two OMCI messages comprise ToD information from the two reference clocks. Thus, according to a first embodiment, ToD information in two time domains are contained in one OMCI message, and according to a second embodiment, ToD information in two time domains are contained in two OMCI messages, i.e. ToD information from a single time domain is contained in each of the two OMCI messages. In signal S23, the OLT sends the one or two OMCI messages to the ONU, and in step 24, the ONU creates two individual ToD messages, each ToD message comprising ToD information from only one reference clock, i.e. in one time domain, and forwards the two individual ToD messages S25, S26, to the two client equipment 5a, 5b, respectively.

In order to transmit individual ToD information based on different reference clocks to the ONU over an ODN, the OLT is provided with an additional functionality for managing multiple time domains, and for creating one or more OMCI messages for transporting ToD information based on two or more reference clocks to an ONU. In order to receive and handle ToD information based on two or more different reference clocks received from the OLT in one or more OMCI messages, the ONU is provided with an additional functionality for managing the multiple time domains. This functionality in the ONU is responsible for recovering the time in the two or more time domains from the received one or more OMCI messages, and provide the time values to the local clock and to a timing master server in the ONU. Thereby, multiple time domains may be handled in the PON.

The ToD information may be transported from the OLT to the ONU only once, or periodically, e.g. either only when the ONU is connecting to the OLT, or, alternatively, with defined intervals, wherein updated TOD information may be transported.

Figure 3:
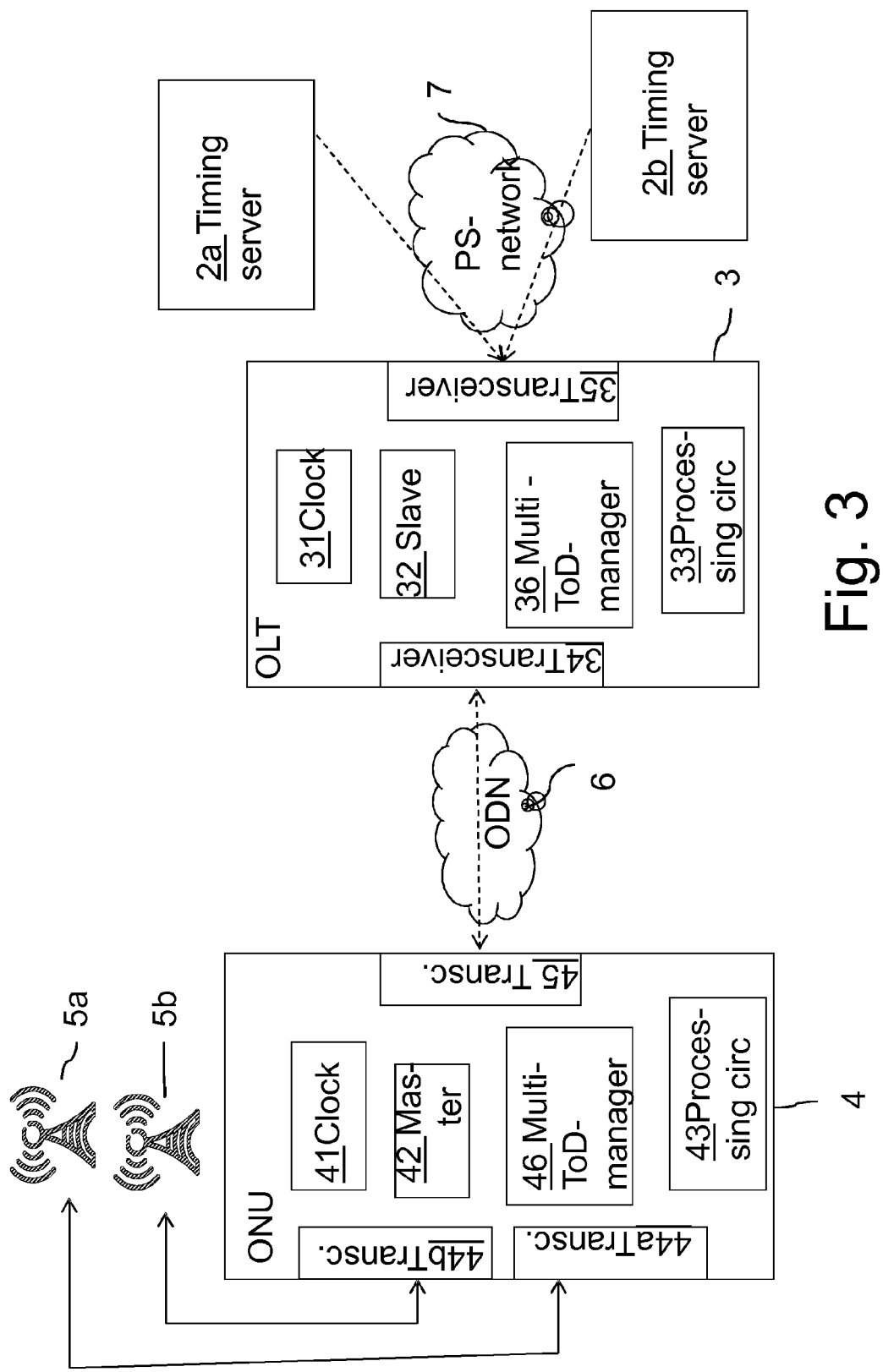
FIG. 3 schematically illustrates an exemplary architecture for ToD-synchronization of two client equipment, with different reference clocks.

An architecture for ToD-synchronization of two client equipment with different reference clocks, according to exemplary embodiments, is schematically illustrated in FIG. 3.

Figure 4:
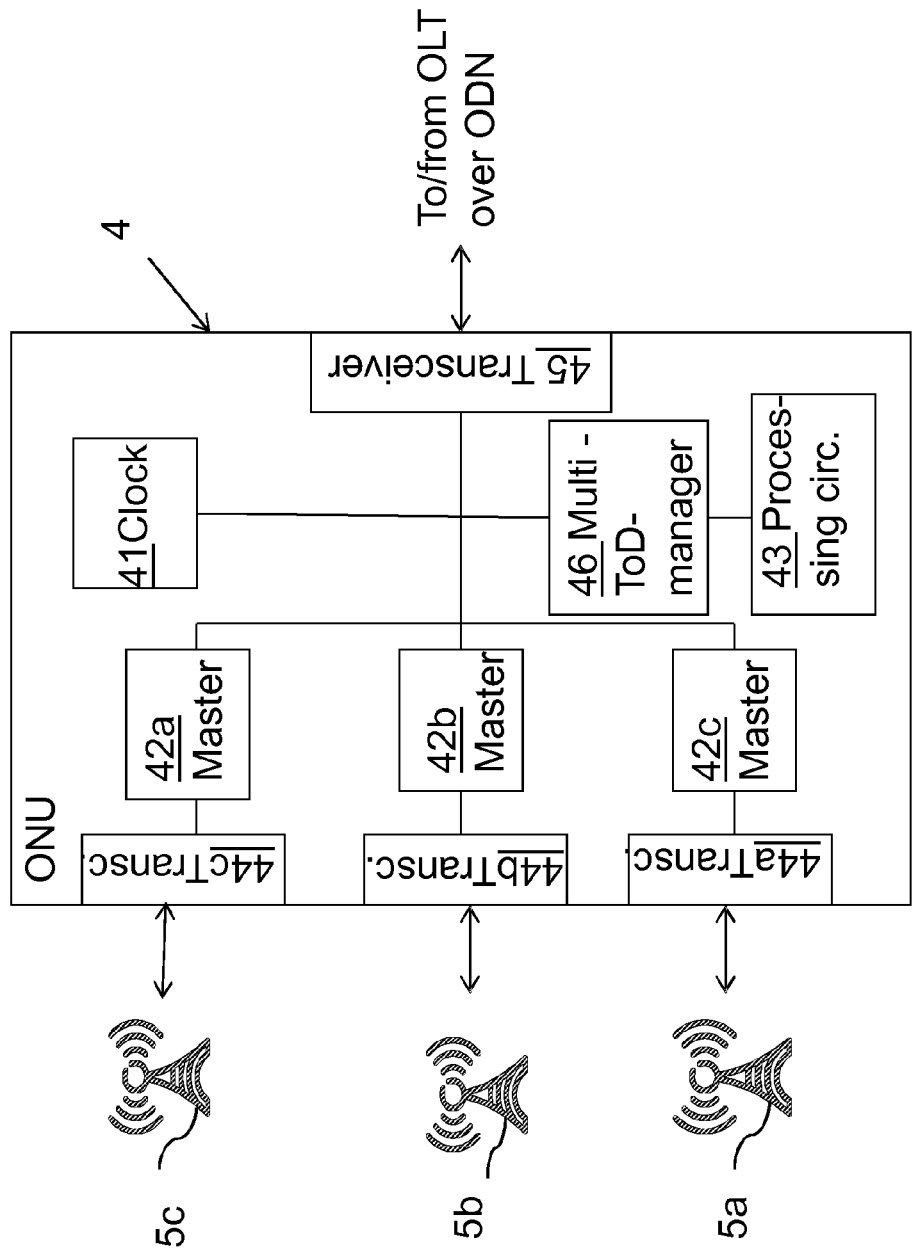
FIGS. 4 and 5 schematically illustrates two different exemplary embodiments of an ONU connected to three client equipment.
Figure 5:
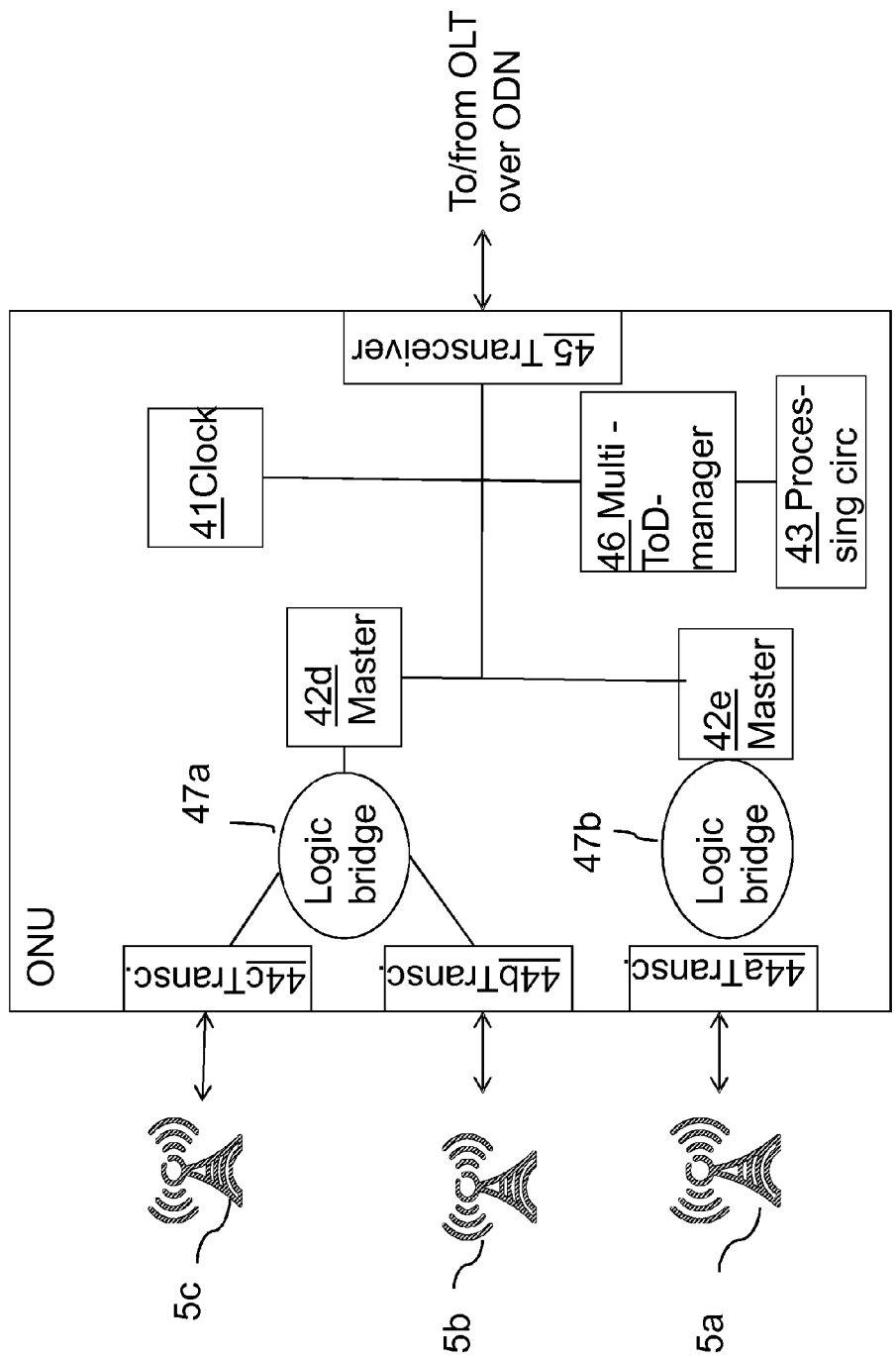

Please note that the illustrated units in the OLT and the ONU in the FIGS. 3-5 are only logical units for indicating a specific function of the OLT and the ONU, and the functions may be implemented by any appropriate hardware and/or software. Further, the connections between the logical units are not shown in FIG. 3, in order to simplify the figure.

In FIG. 3, an OLT 3 is connected to two timing servers 2a and 2b, over a packet-switched network 7. Alternatively, the OLT may be connected to only one timing server that is able to provide multiple time domains to the OLT. The OLT will act as a slave to the timing server for each of the time domains, but only one time domain will carry the master time used as time reference by the OLT. Thus, the OLT 3 comprises slave functions 32 to both of said timing servers 2a, 2b, a local clock (oscillator) 31, and suitable processing circuitry 33. The OLT in FIG. 3 is further provided with an additional functionality for managing multiple time domains, and the functionality is illustrated by the multi-ToD manager 36. The multiple time domains correspond to ToD information from two or more reference clocks received from the timing servers 2a, 2b.

The OLT 3 receives ToD information from the two or more reference clocks from the timing servers 2a, 2b, via the transceiver 35, and the slave functions 32 in the OLT recovers the time from the ToD-information and sets the time of the OLT clock 31 according to the master time domain, and forwards the individual time values from the two or more reference clocks to the multi-ToD manager 36 in the OLT. The multi-ToD manager creates one or more OMCI messages for transporting the ToD information based on two or more reference clocks over the ODN, and sends the one or more OMCI messages to the ONU 4 via the transceiver 34, in order to synchronize the local clock 41 in the ONU with the master time domain of the local clock 31 in the OLT, and synchronize client equipment connected to the ONU with the appropriate time domain, that may differ from said master time domain.

According to a first exemplary embodiment, the ToD information based on two or more reference clocks are transported in a single OMCI message created by the multi-ToD manager in the OLT, and according to a second exemplary embodiment, the ToD information based on two or more reference clocks are transported in two or more OMCI messages. Thus, in the second embodiment, one OMCI message is created for ToD information based on each reference clock.

The ONU 4 in FIG. 3 is connected to the OLT via the transceiver 45, and comprises a master function 42 acting as a master server to the timing servers 2a, 2b, a local clock 41, and suitable processing circuitry 43. In FIG. 3, the ONU is connected to two client equipment 5a, 5b, via the transceivers 44a and 44b, respectively. Each client equipment is associated with an individual reference clock, and the client equipment may e.g. be base stations connected to different operators. The ONU in FIG. 3 is also provided with an additional functionality for managing multiple time domains, and the functionality is illustrated by the multi-ToD manager 46 in FIG. 3, which recovers individual time values from OMCI messages received from the OLT via the transceiver 45. The multi-ToD manager 46 provides the individual time values to the master function 42, and the time value according to the master time domain to the local clock 41. The master function 42 then forwards each individual time value to the corresponding client equipment 5a, 5b via the transceivers 44a, 44b.

FIG. 4 illustrates schematically an ONU 4 connected to three client equipment 5a, 5b, 5c, via three transceivers 44a, 44b, 44c, i.e. three physical ports, and wherein the master function 42 is divided into three parts, 42a, 42b and 42c. This figure illustrates in more detail how an ONU may provide different time domains to different client equipment, via different physical ports (user network interfaces, UNI), wherein each physical port handles a different time domain, and provides the network time of an operator to the client equipment, i.e. a base station, that is connected to the operator. The ONU is configured to know which time domain to connect to each physical port in order to allow flexibility in the use of the ports, and may use e.g. the OMCI, or any other suitable management interface.

FIG. 5 illustrates an ONU connected to three client equipment 5a, 5b, 5c, via three transceivers 44a, 44b, 44c, i.e. three physical ports, but wherein the master function 42 is divided into only two parts, 42a, 42b. The figure also illustrates that the ONU comprises a logical bridge, 47a, 47b connected to each part of the master function, in order to serve all the ports connected to the bridge.

Thus, according to embodiments of this invention, a transport of multiple time domains over the ODN is accomplished by transporting multiple ToD information over the ODN in one or more OMCI messages, wherein each OMCI message comprises one Managed Entity.

According to the above-mentioned first exemplary embodiment, multiple ToD information are transported in one OMCI message, i.e. in a single OMCI message, by extending the OLT-G Managed Entity of the OMCI message with an attribute for additional time domains. Thereby, the OLT-G Managed Entity may accommodate multiple ToD information, which will allow a transport of multiple time domains in only one OMCI message.

According to an exemplary embodiment of this first exemplary embodiment, the OLT-G ME is extended by additional attributes for additional time domains. An exemplary additional attribute for such additional time domains is indicated schematically below:

Time of day information, additional time domains: This attribute could be a list/table of entries, each entry representing an additional time domain, and the corresponding time of day information. Each entry could be outlined as indicated below: Row control (1 byte): The two least significant bits of the byte could indicate if to write or delete a specified row, or clear the whole table.

Time domain index (1 byte): This field could provide an index of the time domain, to be used by other MEs to select a time domain. It should be unique and non-zero.

Time of day information (10 bytes): This field could provide the information required to achieve time of day synchronization with additional time domains. It could specify the time of an additional time domain in a timestamp ($Tstamp_N$).

Thus, the Time-of-day information-attribute would correspond to time domain 0, which may be a default reference for any service that requires synchronization. If a MAC bridge port or other Managed Entity requires a different time domain, it may refer to a non-zero time domain-index contained in the list/table of entries, wherein each entry represents an additional time domain.

According to the above-mentioned second exemplary embodiment, multiple ToD information, i.e. multiple time domains, are transported over the ODN in multiple OMCI messages, such that ToD information based on one reference clock is transported in one OMCI message. An exemplary embodiment of this second embodiment uses a dedicated ToD Managed Entity for each additional time domain, in addition to the conventional standardized OLT-G Managed Entity for the first time domain. Such a ToD Managed Entity is instantiated for each additional time domain, and the ToD Managed Entity instance number will be unique for each additional time domain. This allows a transport of multiple time domains over the ODN in multiple OMCI messages. An exemplary ToD Managed Entity for additional time domains is indicated schematically below:

Managed entity ID: This attribute uniquely identifies each instance of the managed entity, and this attribute would be mandatory, and could have 2 bytes.

Time of day information: This attribute provides the information required to achieve time of day synchronization with an additional time domain, and may comprise two fields. The first field, with 4 bytes, is the sequence number of the specified GEM superframe, and the second field, with 10 bytes, is a timestamp ($Tstamp_N$). The value 0 in all bytes is reserved as a null value.

However, other exemplary embodiments for transporting multiple time domains in one or more OMCI messages are possible, e.g. by any appropriate combination of the above-described first and second embodiments.

Figure 6:
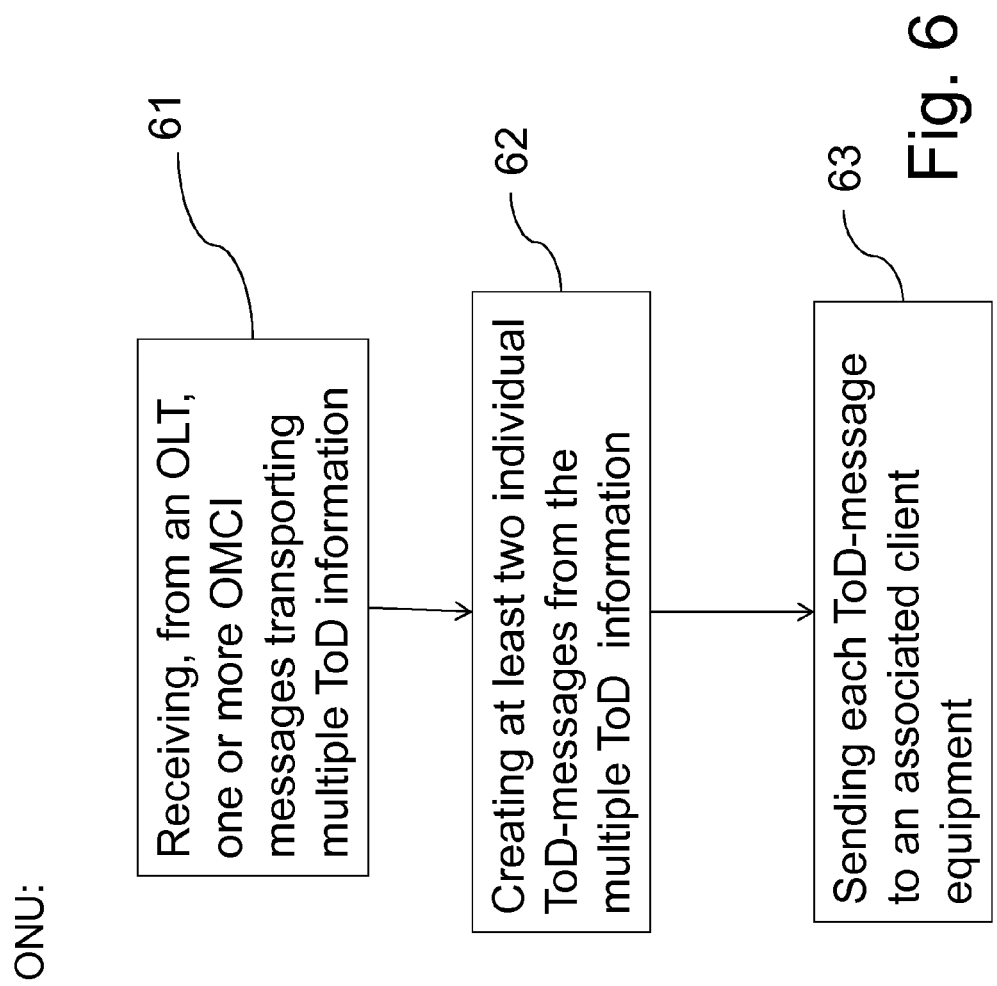
FIG. 6 is an exemplary flow diagram schematically illustrating an ONU performing ToD-synchronisation of two or more client equipment, with different reference clocks.

FIG. 6 is a flow diagram schematically illustrating a method for an ONU of managing a time-of-day synchronization of at least two client equipments with at least two reference clocks, according to exemplary embodiments of this invention, wherein the time-of-day synchronization comprises a transport of time-of-day information from the at least two reference clocks over the ODN. In step 61, the ONU receives one or more OMCI messages from an OLT, wherein the one or more OMCI messages is/are transporting time-of-day information from the at least two reference clocks, i.e. at least two time values that may be different. After having received the at least two time values from the OLT, the ONU creates, in step 62, at least two individual time-of-day messages, wherein each time-of-day message is based on ToD information from one reference clock, and is intended for synchronization of at least one client equipment. Thereafter, the ONU sends, in step 63, each time-of-day message to the corresponding client equipment.

According to a further embodiment, the ONU synchronizes its local clock 41 (see e.g. FIG. 3) with the master time domain received in the one or more OMCI messages.

According to an exemplary embodiment, each of said one or more OMCI messages comprises only one Managed Entity, which comprises time-of-day information from one or more reference clock.

Further, according to a first alternative embodiment, the time-of-day information from the at least two reference clocks are transported over the ODN in a single OMCI message, in only one Managed Entity, which is extended to accommodate multiple time domains.

According to a second alternative embodiment, the time-of-day information is transported over the ODN in at least two OMCI messages, each OMCI message comprising only one Managed Entity, which contains time-of-day information from only one of said reference clocks.

FIG. 7 is a flow diagram schematically illustrating a method for an OLT of managing a time-of-day synchronization with at least two reference clocks, according to exemplary embodiments of this invention, wherein the time-of-day synchronization comprises a transport of multiple time domains to an ONU over the ODN. In step 71, the OLT receives, from one or more timing servers, time-of-day information from at least two reference clocks, wherein each time-of-day information is associated with at least one client equipment connected to the ONU. After having received the multiple time-of-day information, the OLT creates, in step 72, one or more OMCI messages for transporting said two or more time-of-day information over the ODN. In step 73, the OLT sends the one or more OMCI messages to the ONU, for synchronization of each client equipment with the corresponding reference clock.

According to a further embodiment, the OLT synchronizes its local clock 31 (see e.g. FIG. 3) with the time recovered from the received time-of-day information in one of the time domains.

According to an exemplary embodiment, each of said one or more OMCI messages comprises only one Managed Entity, which comprises time-of-day information from one or more reference clock.

Further, according to a first alternative embodiment, the time-of-day information from the at least two reference clocks are transported over the ODN in a single OMCI message, in only one Managed Entity, which is extended to accommodate multiple time domains.

According to a second alternative embodiment, the time-of-day information from the at least two reference clocks are transported over the ODN in at least two OMCI messages, each OMCI message comprising only one Managed Entity, which contains time-of-day information from only one of said reference clocks.

Figures 8A, 8B:
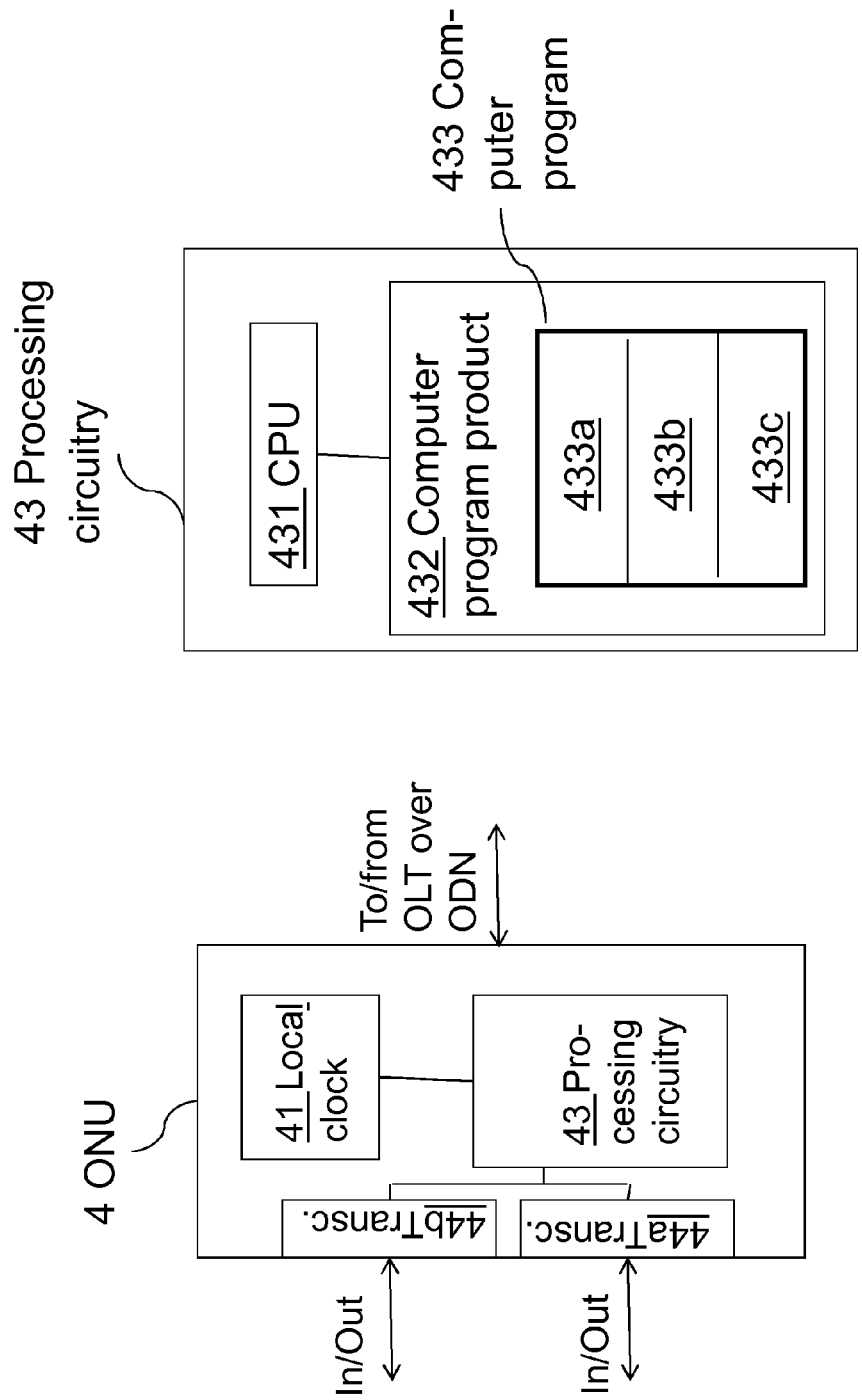
FIGS. 8a and 8b schematically illustrates an exemplary ONU, and an exemplary processing circuitry in the ONU, and FIGS. 9a and 9b schematically illustrates an exemplary OLT, and an exemplary processing circuitry in the OLT.

FIG. 8a illustrates schematically an ONU 4, according to exemplary embodiments of the invention. The ONU is connectable to an OLT over an ODN, and to client equipment e.g. via the transceivers 44a, 44b, and is arranged to manage a time-of-day synchronization with at least two reference clocks. The ONU comprises processing circuitry 43 that is configured to receive one or more OMCI messages from the OLT over the ODN. The one or more OMCI messages, i.e. a single OMCI message or at least two OMCI messages, is/are transporting time-of-day information from the at least two reference clocks, and each reference clock is associated with at least one connected client equipment. The processing circuitry is further configured to create at least two individual time-of-day messages, based on the time-of-day information in the one or more OMCI messages, wherein each individual time-of-day message is based on time-of-day information from one reference clock. The processing circuitry is also configured to send each individual time-of-day message to the one or more client equipment associated with the reference clock of the time-of-day messages, for synchronization of the client equipment with the reference clock.

It is apparent to the skilled person that the ONU also comprises a suitable transceiver (not illustrated in FIG. 8a) for communicating with the OLT over the ODN According to a further embodiment, the ONU comprises a local clock 41, and the ONU is arranged to synchronize the local clock with one of the reference clocks.

According to an exemplary embodiment, each of said one or more OMCI messages comprises only one Managed Entity, which comprises time-of-day information from one or more reference clock.

Further, according to a first alternative embodiment, the time-of-day information from the at least two reference clocks are transported over the ODN in a single OMCI message, in only one Managed Entity, which is extended to accommodate multiple time domains.

According to a second alternative embodiment, the time-of-day information from the at least two reference clocks are transported over the ODN in at least two OMCI messages, each OMCI message comprising only one Managed Entity, which contains time-of-day information from only one of said reference clocks.

FIG. 8b schematically illustrates the processing circuitry 43, as illustrated in FIG. 8a. The processing circuitry comprises a CPU 431, which may be a single unit or a plurality of units. Furthermore, the processing circuitry comprises at least one computer program product 432, in the form of a non-volatile memory, e.g. an EEPROM (Electrically Erasable Programmable Read-Only Memory), a flash memory or a disk drive. The computer program product 432 comprises a computer program 433 comprising computer readable code which when run on the ONU causes the CPU 431 to perform at least the steps illustrated in FIG. 6.

Thus, in the exemplary embodiment illustrated in FIG. 8a, the computer readable code in the computer program 433 comprises a receiving module 433a, a creating module 433b, and a sending a module 433c, which interact with the transceivers and with other hardware in the ONU in order to perform at least the steps of the flow in FIG. 6.

FIG. 9a illustrates schematically an OLT 3, according to exemplary embodiments of the invention. The OLT is connectable to an ONU over an ODN, and is arranged to manage a time-of-day synchronization with at least two reference clocks. The OLT comprises processing circuitry 33 that is configured to receive, e.g. from one or more timing servers, time-of-day information from at least two reference clocks. The processing circuitry is further configured to create one or more OMCI messages, such as a single OMCI message or at least two OMCI messages, for transporting the time-of-day information from the at least two reference clocks over the ODN, wherein each reference clock is associated with at least one client equipment that is connected to the ONU. The OLT is also configured to send the one or more OMCI messages to the ONU over the ODN, for synchronizing the client equipment with an associated reference clock.

It is apparent to the skilled person that the OLT also comprises suitable transceivers (not illustrated in FIG. 9a) for communicating with the ONU over the ODN, and with one or more timing servers over a packet-switched network.

According to a further embodiment, the OLT comprises a local clock 31, and is arranged to synchronize its local clock with the time recovered from the received time-of-day information in one of the time domains.

According to an exemplary embodiment, each of said one or more OMCI messages comprises only one Managed Entity, which comprises time-of-day information from one or more reference clock.

Further, according to a first alternative embodiment, the time-of-day information from the at least two reference clocks are transported over the ODN in a single OMCI message, in only one Managed Entity, which is extended to accommodate multiple time domains.

According to a second alternative embodiment, the time-of-day information from the at least two reference clocks are transported over the ODN in at least two OMCI messages, each OMCI message comprising only one Managed Entity, which contains time-of-day information from only one of said reference clocks.

FIG. 9b schematically illustrates the processing circuitry 33, as illustrated in FIG. 9a. The processing circuitry comprises a CPU 331, which may be a single unit or a plurality of units. Furthermore, the processing circuitry comprises at least one computer program product 332, in the form of a non-volatile memory, e.g. an EEPROM (Electrically Erasable Programmable Read-Only Memory), a flash memory or a disk drive. The computer program product 332 comprises a computer program 333 comprising computer readable code which when run on the OLT 3 causes the CPU 331 to perform at least the steps illustrated in FIG. 7.

Thus, in the exemplary embodiment illustrated in FIG. 9a, the computer readable code in the computer program 333 comprises a receiving module 333a, a creating module 333b, and a sending module 333c, which interact with transceivers and with other hardware in the OLT in order to perform at least the steps of the flow in FIG. 7.

It is an advantage with exemplary embodiments described above that each operator in a multi-operator environment, e.g. in which one fixed network is providing Mobile Backhaul (MBH) services to client equipment served by different mobile operators, may have its own timing source or reference clock. Thus, multiple time domains are provided, i.e.

individual time-of-day information to each operator, enabling a time-of-day synchronization of multiple client equipment that are connected to the same ONU, but are served by different operators with different reference clocks.

It may be further noted that the above described embodiments are only given as examples and should not be limiting to the present invention, since other solutions, uses, objectives, and functions are apparent within the scope of the invention as claimed in the accompanying patent claims.

ABBREVIATIONS

PON—Passive Optical Network
G-PON—Gigabit-capable Passive Optical Network
ODN—Optical Distribution Network
OLT—Optical Line Termination
ONT—Optical Network Terminal
ONU—Optical Network Unit
CPE—Customer Premises Equipment
RN—Remote Node
OMCI—ONT Management and Control Interface
ME—Managed Entity
ToD—Time of Day
PDV—Packet Delay Variation

The invention claimed is:

1. A method for an Optical Network Unit (ONU) in a Passive Optical Network (PON) of managing a time-of-day synchronization with at least two reference clocks, wherein the ONU is connected to an Optical Line Termination (OLT) over an Optical Distribution Network (ODN) and to at least two client equipment, the method comprising:
receiving one or more Optical Network Terminal (ONT) Management and Control Interface (OMCI) messages from the OLT, said one or more OMCI messages transporting time-of-day information from the at least two reference clocks over the ODN, wherein each of the at least two reference clocks is associated with at least one of said at least two client equipment;
creating at least two individual time-of-day messages, each message being based on time-of-day information from a corresponding one of said at least two reference clocks; and
sending each of the at least two individual time-of-day messages to the at least one of said at least two client equipment associated with the corresponding one of the at least two reference clocks, for synchronizing each of the at least two client equipment with its associated reference clock.

2. The method according to claim 1, wherein each of said one or more OMCI messages comprises a single Managed Entity (ME) which contains time-of-day information from one or more of said at least two reference clocks.

3. The method according to claim 1, wherein the time-of-day information from said at least two reference clocks is transported over the ODN in a single OMCI message.

4. The method according to claim 3, wherein the single OMCI message comprises as single Managed Entity, which contains the time-of day information from the at least two reference clocks.

5. The method according to claim 1, wherein the time-of-day information from said at least two reference clocks is transported over the ODN in at least two OMCI messages, each of said at least two OMCI messages containing time-of-day information from only one reference clock.

6. The method according to claim 5, wherein each of said at least two OMCI messages comprises a single Managed Entity, which contains time of day information from only one of said at least two reference clocks.

7. The method according to claim 1, further comprising synchronizing a local clock in the ONU with one of said at least two reference clocks.

8. A method for an Optical Line Termination (OLT) in a Passive Optical Network (PON) of managing a time-of-day synchronization with at least two reference clocks, wherein the OLT is connected to an Optical Network Unit (ONU) over an Optical Distribution Network (ODN) and the ONU is connected to at least two client equipment, the method comprising:
receiving time-of-day information from at least two reference clocks, wherein each of the at least two reference clocks is associated with at least one of said at least two client equipment;
creating one or more Optical Network Terminal (ONT) Management and Control Interface (OMCI) messages for transporting the time-of-day information from a corresponding one of said at least two reference clocks over the ODN; and
sending the one or more OMCI messages to the ONU over the ODN, for synchronizing each of said at least two client equipment with its associated reference clock.

9. The method according to claim 8, wherein each of said one or more OMCI messages comprises a single Managed Entity (ME) which contains time-of-day information from one or more of said at least two reference clocks.

10. The method according to claim 8, wherein the time-of-day information from the at least two reference clocks is transported over the ODN in a single OMCI message.

11. The method according to claim 10, wherein the single OMCI message comprises a single Managed Entity, which contains the time-of day information from the at least two reference clocks.

12. The method according to claim 8, wherein the time-of-day information from the at least two reference clocks is transported over the ODN in at least two OMCI messages, each of said at least two OMCI messages containing time-of-day information from only one of said at least two reference clocks.

13. The method according to claim 12, wherein each of said at least two OMCI messages comprises a single Managed Entity, which contains time-of-day information from only one of said at least two reference clocks.

14. An Optical Network Unit (ONU) for a Passive Optical Network (PON) the ONU being connectable to an Optical Line Termination (OLT) over an Optical Distribution Network (ODN) and to at least two client equipment, wherein the ONU is arranged to manage a time-of-day synchronization with at least two reference clocks, and comprises processing circuitry configured to:
receive one or more Optical Network Terminal (ONT) Management and Control Interface (OMCI) messages from a connected OLT, said one or more OMCI messages transporting time-of-day information from the at least two reference clocks over the ODN, wherein each of the at least two reference clocks is associated with at least one of the at least two connected client equipment;
create at least two individual time-of-day messages, each message being based on the time-of-day information from a corresponding one of the at least two reference clocks; and
send each individual time-of-day message to the at least one of the at least two connected client equipment associated with the corresponding one of the at least two reference clocks synchronizing each of the at least two client equipment with its associated reference clock.

15. The ONU according to claim 14, wherein the time-of-day information from the at least two reference clocks is transported over the ODN in a single OMCI message.

16. The ONU according to claim 15, wherein the single OMCI message comprises a single Managed Entity (ME) which contains the time-of day information from the at least two reference clocks.

17. The ONU according to claim 14, wherein the time-of-day information from the at least two reference clocks is transported over the ODN in at least two OMCI messages, each OMCI message comprising time-of-day information from only one of the at least two reference clocks.

18. The ONU according to claim 17, wherein each of said at least two OMCI messages comprises a single Managed Entity, contains time-of-day information from only one of the at least two reference clocks.

19. The ONU according to claim 14, the ONU comprising at least two transceivers for communicating with the at least two client equipment, wherein each transceiver is arranged to communicate with one of the at least two equipment over a User Network Interface (UNI).

20. The ONU according to claim 14, further comprising a local clock, wherein the ONU is arranged to synchronize its local clock with one of said at least two reference clocks.

21. An Optical Line Termination for a Passive Optical Network (PON) the OLT being connectable to an Optical Network Unit (ONU) over an Optical Distribution Network (ODN) wherein the OLT is arranged to manage a time-of-day synchronization with at least two reference clocks, and comprises processing circuitry configured to:

receive time-of-day information from at least two reference clocks;

create one or more Optical Network Terminal (ONT) Management and Control Interface (OMCI) messages for transporting the time-of-day information from a corresponding one of said at least two reference clocks over the ODN; and send the one or more OMCI messages to the ONU over the ODN, for synchronizing each of the at least two client equipment connected to the ONU with its associated reference clock.

22. The OLT according to claim 21, wherein the time-of-day information from the at least two reference clocks is transported over the ODN in a single OMCI message.

23. The OLT according to claim 22, wherein the single OMCI message comprises a single Managed Entity (ME) which contains the time-of day information from said at least two reference clocks.

24. The OLT according to claim 21, wherein the time-of-day information from the at least two reference clocks is transported over the ODN in at least two OMCI messages, each of said at least two OMCI messages containing time-of-day information from only one of the at least two reference clocks.

25. The OLT according to claim 24, wherein each of said at least two OMCI messages comprises a single Managed Entity, which contains time-of-day information from only one of the at least two reference clocks.

26. The OLT according to claim 21, wherein the OLT is connectable to one or more timing servers for receiving the time-of-day information.

27. The OLT according to claim 21, further comprising a local clock, wherein the OLT is arranged to synchronize its local clock with at least one of the at least two reference clocks.

* * * * *